United States Patent [19]

Line

[11] 4,256,085
[45] Mar. 17, 1981

[54] METHOD AND SYSTEM FOR GENERATING HEAT

[76] Inventor: Howard C. Line, Walpole Rd. c/o Hillside Orch., Haydenville, Mass. 01039

[21] Appl. No.: 16,863

[22] Filed: Mar. 2, 1979

[51] Int. Cl.³ .............................................. F24C 9/00
[52] U.S. Cl. ...................................... 126/247; 122/26
[58] Field of Search .......................... 126/247; 122/26; 165/122; 237/1 SL, 1 R, 2 R; 415/116; 62/401

[56] References Cited

U.S. PATENT DOCUMENTS

| | | | |
|---|---|---|---|
| 1,126,354 | 1/1915 | Becker | 126/247 X |
| 2,683,448 | 7/1954 | Smith | 126/247 |
| 3,402,702 | 9/1968 | Lore | 126/247 X |
| 3,467,179 | 9/1969 | Tevis et al. | 126/247 X |
| 3,748,057 | 7/1973 | Eskeli | 415/116 |
| 3,926,010 | 12/1975 | Eskeli | 126/26 X |
| 4,004,553 | 1/1977 | Stenstrom | 122/26 |
| 4,027,631 | 6/1977 | Lavery | 122/26 |
| 4,060,194 | 11/1977 | Lutz | 126/247 X |

*Primary Examiner*—George T. Hall
*Attorney, Agent, or Firm*—Eugene M. Bond

[57] ABSTRACT

The invention disclosed provides a new improved method and system for generating heat efficiently by means of frictional heat produced by a rotating impeller disposed within a closed housing which contains a heat transfer liquid and a gaseous layer. Rotation of the impeller generates heat as well as pressure in the system such that circulation of the heat transfer liquid may be readily effected through a closed conduit circuit to a heat dissipator. In a preferred embodiment, the rotating impeller is disposed within a diffuser which functions to increase the velocity of the heat transfer liquid and increase the static pressure within the system.

16 Claims, 2 Drawing Figures

METHOD AND SYSTEM FOR GENERATING HEAT

FIELD OF THE INVENTION

The present invention relates to a system for generating heat by means of a rotating impeller disposed within a closed housing which also defines a heat transfer liquid reservoir having a gaseous layer thereover. An inlet and outlet are positioned in the housing and in fluid communication with the reservoir as well as with a closed conduit circuit. Also, a heat dissipator is positioned to receive and transfer heat from the closed conduit circuit such that frictional heat generated by the impeller may be usefully consumed as desired.

In the method of the present invention, heat is generated by friction of a rotating impeller in a closed housing containing a heat transfer liquid and a gaseous layer. The gas is diffused from the gaseous layer into the heat transfer liquid during frictional heat generation. The heat transfer liquid having imparted heat values and diffused gas is then circulated through a closed conduit circuit to a heat dissipator from which the heat values may be usefully consumed.

BACKGROUND

Numerous devices are available to the art which attempt to generate heat in an energy conservation manner. Typically, devices which are efficient in heat generation prove to be very costly to produce whereas inexpensive devices frequently have low heat generation capacity and correspondingly require supplemental heat generators to perform adequately.

Frictional heat generators are also well known to the art. These heat generators, by their very nature, require large energy input to perform and are useful only when inexpensive sources of energy are available. Because the cost of producing energy continues to increase while conventional sources of energy such as oil are rapidly depleting, new, inexpensive and highly efficient methods for producing heat both for domestic and commercial usage are constantly being sought.

It has now been found that by practice of the present invention, there is provided a new, highly efficient, relatively inexpensive method and system for generating heat by means of a rotating impeller disposed within a housing which contains a heat transfer liquid and a gaseous layer thereover.

SUMMARY OF THE INVENTION

Generally stated, the present invention provides a new, improved method and system for efficiently generating heat by means of frictional forces of a rotating impeller disposed within a closed housing which contains a heat transfer liquid and a gaseous layer. Pressure created by rotation of the impeller serves as a means to force the heat transfer liquid containing imparted heat values received from within the closed housing, through a closed conduit circuit to a heat dissipator from which the imparted heat values may be received and used as desired. Pressure within the system serves to return the heat transfer liquid from the heat dissipator to the closed housing for recycle to the heat dissipator.

It is an object of this invention to provide a new, economical and highly efficient system for generating heat by means of frictional forces created by a rotating impeller disposed within a closed housing containing a heat transfer liquid with a gaseous layer thereover.

It is also an object of this invention to provide a method for generating frictional heat by means of a rotating impeller in a heat transfer liquid while simultaneously dissipating a gas therein.

It is another object of this invention to provide an economical source of heat for commercial and domestic facilities.

It is yet another object of this invention to provide a new, improved frictional heat generator which usefully serves to also transfer imparted heat values under pressure to a dissipator from which the imparted heat values may be usefully consumed.

It is yet another object of this invention to provide a simple, highly efficient frictional heat generator and heat transfer system which by means of a heat dissipator usefully serves to heat either a closed or open heating system for ultimate transfer and usage at a location remote to the frictional heat generator.

These and other objects and advantages will become more apparent from the following more detailed description of the present invention taken in conjunction with the drawings.

DETAILED DESCRIPTION OF PREFERRED EMBODIMENTS

Figure 1:
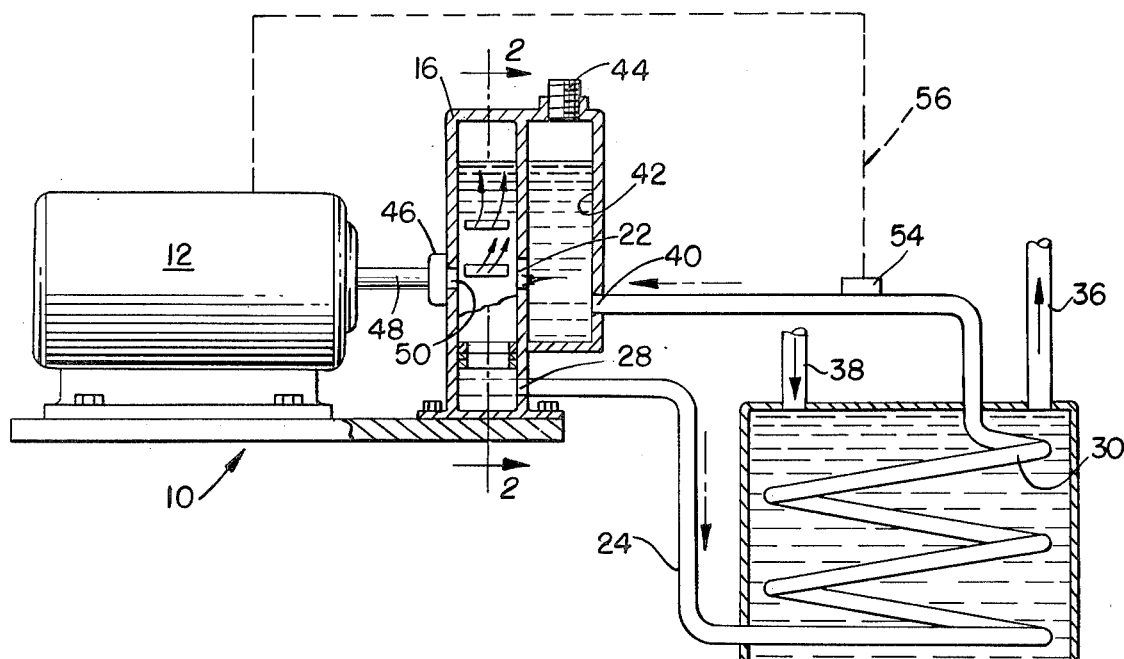
FIG. 1 is a diagrammatical side elevational view taken in partial half-section and illustrating the method and system for generating heat by practice of the present invention.
Figure 2:
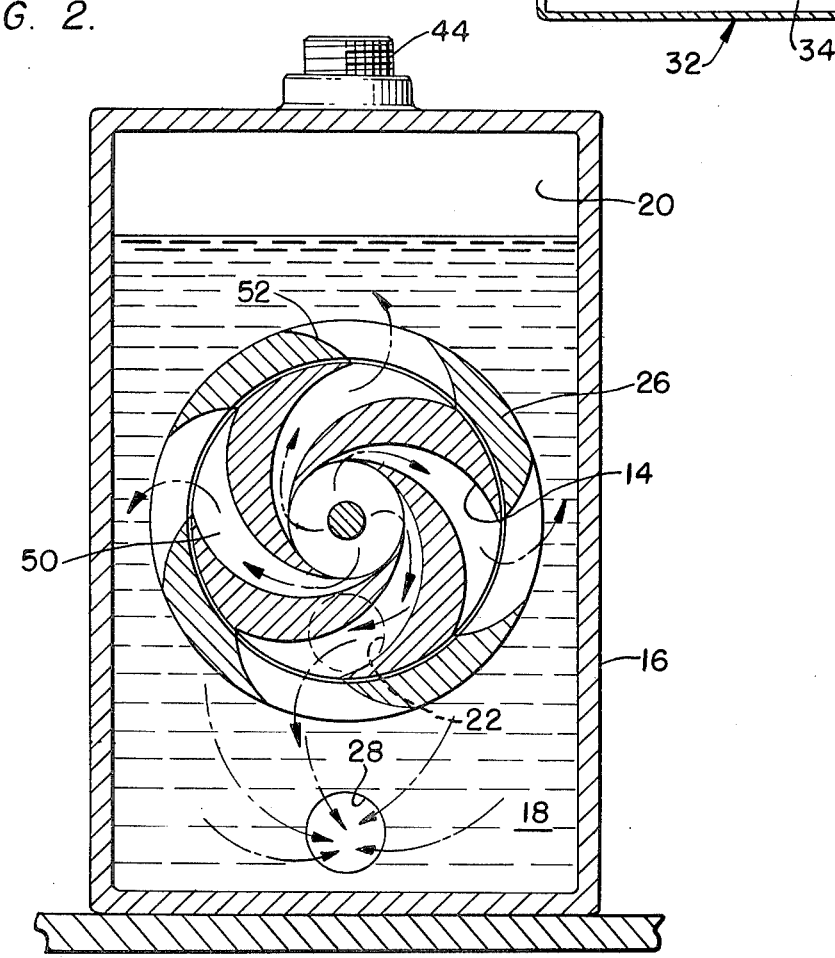
FIG. 2 is a front elevational view of the heat generating means of the present invention taken in half-section along sectional lines 2—2 of FIG. 1.

In the drawings wherein similar elements are identified by like numerals throughout the several views, FIG. 1 illustrates system 10 for generating frictional heat by drive means 12 which functions to rotate impeller 14 within a diffuser 26 which is enclosed within housing 16. Heat transfer liquid 18 is disposed within the closed housing to a limited level such that a gaseous layer 20 remains within the system. Normally, the level of the heat transfer liquid is slightly above the operational level of the impeller. However, it is possible to operate the present system when the liquid level is somewhat lower. As a practical matter, however, the liquid level must always be above the intake opening 22 for the impeller as well as above the level of the closed conduit circuit 24. Thus, although gas from layer 20 becomes diffused in the system as fine bubbles by means of diffuser 26, the system must nevertheless operate free of an air lock.

The presence of the gaseous layer, typically air although other gases may be used without limitation, serves several useful functions in the operation of the present system. Firstly, because the reservoir is not completely filled with liquid, less resistance is present for rotation of the impeller with the corresponding advantage that less energy is required to drive the liquid. If also appears that the gaseous layer becomes diffused within the liquid passing through the closed conduit circuit with a larger volume being available between the impeller and the dissipator because of larger bubbles due to larger heat values that the volume between the dissipator and the return. Thus, circulation of the liquid appears to establish a momentum once steady-state operation is achieved.

Drive means 12 is illustrated as an electrical motor and as a practical matter is the preferred unit to drive the impeller for heat generation. However, it is also possible to use most any means to drive the impeller provided that sufficient momentum is maintained. For example, manually operated mechanical means may be employed as well as wind driven elements, gas driven and steam driven engines.

Impeller 14 may be either an open faced unit or preferably is a channeled unit such as that which is illustrated. In the illustrated unit, radially diverging channels 50 projecting in a direction opposite to the directional rotation pass liquid to the diffuser 26 which is stationary relative the impeller and disposed about the circumference. The diffuser also includes radially projecting channels 52 oppositely positioned to those of the impeller to diffuse liquid passing into reservoir 18. Rotation of the impeller within the diffuser creates a turbulence in the reservoir 18 with dispersion of fine gas bubbles in the liquid being heated coupled with a pressure build-up which readily forces the heated liquid containing entrapped gas through the closed conduit circuit 24.

It is also found in practice of the present invention that higher temperatures are generated when the impeller is constructed as a rough cast as opposed to one having smooth polished surfaces. The same rough construction applies to the diffuser. Typically, both the impeller and diffuser may be prepared using either cast metal or most any plastic having sufficient strength to stand the pressures and temperatures of the system. When plastic materials are used, it may be necessary to score the surfaces to create the rough surfaces.

The impeller and the diffuser may be configurated as desired provided sufficient frictional heat is generated. Also, these elements may be made in various sizes as desired to develop a greater or lesser temperature and pressure build-up in the system. When a larger impeller and diffuser are used, a larger amount of heat transfer liquid can flow through the system with a corresponding increase in volume of heat being generated. Alternatively, when a smaller impeller and diffuser are used, a smaller amount of liquid flow and heat are generated. In the latter instance, less energy is required to drive the system.

When impeller 14 builds sufficient pressure in the system, heat transfer liquid having diffused gas therein passes via outlet 28 into the closed conduit circuit 24 and to heat dissipator 30 where imparted heat values may be used such as by passage in heat transfer tank 32 containing a relatively large mass of liquid 34 for transfer to a location remote from the heat generating system 10. Transfer may be effected by any suitable pump, not shown, by passage through outlet pipe 36 and return pipe 38. It is also practiced to use a forced air system as the method for transfer of heat values received from the dissipator 30 to a use location. Numerous other usages of the generated heat will be readily apparent inasmuch as the present system may be substituted for most any heating system such as for either residential or commercial heating purposes.

The impeller and diffuser which are used together may be components of most any pump such as those commonly referred to as a centrifical motion pump. The pump disirably includes a diffuser positioned about the rotating impeller such that by using controlled flow, heat is created by friction within the molecules forming the heat transfer liquid.

It will also be appreciated that higher revolutions of the impeller produce greater pressure and heat build-up in the system. The rise in temperature of the liquid through frictional forces is related to the increase of pressure exerted upon the movement of liquid and entrapped gas through the closed conduit circuit.

The heated liquid may be forced through the closed conduit circuit 24 by pressure build-up created by impeller 14 for passage to the dissipator where heat may be usefully consumed following which the liquid is returned for recycle through the system. However, when an open faced impeller is used to generate frictional heat, it is found that an auxilliary pump, not shown, may be required to circulate the liquid through the closed conduit circuit. The auxilliary pump is necessary in those instances where insufficient pressure is created by the rotation movement of the impeller.

After heat values are removed at the dissipator, the heat transfer liquid within the closed conduit circuit returns to inlet 40 of the closed housing 16 for recycle with added heat values through the system.

Although it is not necessarily required, closed housing 16 includes a supplemental reserve tank 42 to insure that a proper quantity of heat transfer liquid 34 remains within the system. For either initial addition of the heat transfer liquid to the system or alternatively for make-up purposes, stopper 44 is included at some convenient location such as stop supplemental reserve tank 42.

During start-up of the present system and to permit usage of a low horse-power motor to operate the impeller, slip clutch 46, or alternatively bearing if desired, may be included intermediate the motor drive axle 48 and the impeller drive axle 50. The slip clutch 46 may be configurated as any automatic clutch or equivalent mechanism which allows a drive motor to accelerate to normal running speed while using a limited amount of effective torque to operate the impeller. The clutch thus permits uniform acceleration of the motor regardless of the amount of torque required to operate the impeller during start-up conditions. Once the motor achieves normal running speed, the momentum of the impeller will be increased to its normal operational level.

The present method thus provides a procedure for creating heat through the means of friction motion of the impeller within the heat transfer liquid coupled with the inducement of air into the liquid prior to circulation through the system.

Although only one drive means and centrifical pump is illustrated in concert, it will be readily apparent that two or more units may be converted in series with one closed conduit circuit to increase the temperature being generated. Also, by using multiple units in series, it is possible to more accurately control the amount of heat being generated by using one or more units as auxilliary heaters.

Thermostat 54 may be positioned at any convenient location to read the temperature of the liquid passing through the system. By means of line 56, operation of motor 12 may be regulated depending upon the temperature desired in the system.

The length of the closed conduit circuit is limited by practical considerations regarding the temperature of the return liquid relative the temperature of the reservoir liquid. It appears that the closer these respective inlet and outlet temperatures are to each other, the lesser is the degreee of heat build-up which is required and correspondingly the liquid may be more rapidly circulated through the system with improved heat transfer efficiency.

It will now be apparent from the foregoing description that a principal purpose accomplished by practice of the present invention is the generation of heat at a reasonable cost without direct consumption of fossil fuels as a source of combustible heat. Relatively, only a small amount of fossil fuel need be consumed for generation of electricity when an electric motor is used as the drive means.

It will also be readily apparent to those skilled in the art that numerous modifications may be made in the various elements of the present invention without departing from practice of the invention as disclosed.

What is claimed is:

1. A system for generating heat which comprises in combintion:
   (A) means for rotating an impeller disposed within a closed housing, said closed housing defining a reservoir containing a heat transfer liquid and having a gaseous layer thereover;
   (B) an inlet and an outlet disposed in the housing, said inlet and outlet being positioned in fluid communication with the reservoir and with a closed conduit circuit;
   (C) a heat dissipator positioned to receive and transfer heat from the closed conduit circuit;
   whereby frictional heat generated by the impeller in the reservoir is imparted to the heat transfer liquid which is then forced to circulate through the closed conduit circuit by means of pressure created by the impeller.

2. The system for generating heat as defined in claim 1 wherein the impeller is disposed within a fluid diffuser.

3. The system for generating heat as defined in claim 1 wherein the means for rotating the impeller is an electrical motor, and wherein a drive shaft of said motor is connected by an intermediate slip clutch to the means for driving the impeller.

4. The system for generating heat as defined in claim 1 wherein the heat dissipator is integral with the closed conduit circuit.

5. The system for generating heat as defined in claim 1 wherein the heat transfer liquid is oil, or water and wherein the gaseous layer is air.

6. The system for generating heat as defined in claim 1 wherein the highest level of closed conduit circuit is below the non-operating normal state interface boundary of the heat transfer liquid and the gaseous layer.

7. The system for generating heat as defined in claim 6 wherein the interface boundary of the heat transfer liquid and the gaseous layer is above the impeller.

8. The system for generating heat as defined in claim 2 wherein the impeller, diffuser, and closed housing is a centrifical pump.

9. The system for generating heat as defined in claim 1 wherein the means for driving the impeller to effect generation of heat is augmented by a separate means to circulate the heat transfer liquid through the system.

10. The system for generating heat as defined in claim 1 wherein diffused gas from the gaseous layer is circulated with the heat transfer liquid through the closed conduit circuit.

11. A method for generating heat which comprises, generating frictional heat by rotating an impeller within a closed housing, containing a heat transfer liquid and a gaseous layer, diffusing gas from the gaseous layer into the heat transfer liquid during frictional heat generation, circulating heat transfer liquid having imparted heat values and diffused gas through a closed conduit circuit, and withdrawing imparted heat values by means of a heat dissipator, whereby frictional heat generated by the impeller may be usefully consumed at the heat dissipator.

12. The method of claim 11 wherein the gas is diffused within the heat transfer liquid by means of a fluid diffuser disposed about the impeller.

13. The method of claim 11 wherein the impeller is rotated by means of an electrical motor.

14. The method of claim 11 wherein circulating of the heat transfer liquid having imparted heat values and diffused gas is effected at a level below the non-operating, normal state interface boundary of the heat transfer liquid and the gaseous layer.

15. The method of claim 11 wherein the heat transfer liquid is oil or water and wherein the gaseous layer is air.

16. The method of claim 14 wherein the said interface boundary is above the impeller.

* * * * *